United States Patent [19]

Strachwitz

[11] Patent Number: 5,656,171
[45] Date of Patent: Aug. 12, 1997

[54] MAGNETIC WATER ACTIVATING PROCESS AND APPARATUS FOR REDUCING CORROSION AND LIME DEPOSITS FROM FLOWING WATER

[76] Inventor: Michael Graf Strachwitz, Wallbrunnweg 1 A-5422, Bad Dürrenberg, Austria

[21] Appl. No.: 117,015
[22] PCT Filed: Mar. 17, 1992
[86] PCT No.: PCT/EP92/00580
   § 371 Date: Sep. 8, 1993
   § 102(e) Date: Sep. 8, 1993
[87] PCT Pub. No.: WO92/16460
   PCT Pub. Date: Oct. 1, 1992

[30] Foreign Application Priority Data

Mar. 18, 1991 [DE] Germany ............... 41 08 817.4

[51] Int. Cl.⁶ ...................................... C02F 1/48
[52] U.S. Cl. .............. 210/695; 210/175; 210/194; 210/222
[58] Field of Search ............... 210/175, 222, 210/223, 695, 194; 122/380, 379, 390

[56] References Cited

U.S. PATENT DOCUMENTS

| | | | |
|---|---|---|---|
| 430,461 | 6/1890 | Bull | 122/379 |
| 1,944,817 | 1/1934 | Thomas | 122/379 |
| 4,257,355 | 3/1981 | Cook | 122/390 |
| 4,512,289 | 4/1985 | Collins | 210/222 |
| 4,611,615 | 9/1986 | Petrovic | 137/13 |
| 4,662,314 | 5/1987 | Moore, Jr. | 210/22 |
| 4,731,186 | 3/1988 | Belasco | 210/695 |
| 4,892,655 | 1/1990 | Makovec | 210/695 |
| 4,898,124 | 2/1990 | Granberg et al. | 122/380 |
| 4,956,083 | 9/1990 | Tovar | 210/222 |
| 5,149,438 | 9/1992 | Hebert | 210/695 |

FOREIGN PATENT DOCUMENTS

| | | |
|---|---|---|
| 90 48629 | 1/1990 | Albania . |
| 91 76087 | 4/1991 | Austria . |
| 0 057 500 | 8/1982 | European Pat. Off. . |
| 0 295 463 | 12/1988 | European Pat. Off. . |
| 30 18 854 A1 | 11/1981 | Germany . |
| 38 29 515 | 3/1990 | Germany . |
| 89 13 274.2 | 3/1990 | Germany . |

(List continued on next page.)

OTHER PUBLICATIONS

Hasson et al, "Effectiveness of Magnetic Water Treatment in Suppressing $CaCO_3$ Scale Deposition", 1985, vol. 24, pp. 588–592, Ind. Eng. Chem. Process Des. Dev. 1985.

G.J.C. Limpert et al, "Tests of nonchemical scale control devices in once–through system", vol. 24, 1985, pp. 40–45, Nonchemical Scale Control Devices.

von Heinrich Sontheimer, "Water for drinking", Waserchemie Karlsruhe, Heft 30, 1986, pp. 11–21.

Von H. Hofer, "Physical water treatment apparatus"; Gas/Wasser/Wärme 42 (1988), 7, pp. 218–219.

Ivo Wagner; "Drinking water treatment–claims and reality of the chemical and physical methods", gwf–Wasser Abwasser, 130, (1989), 5, pp. 251–254.

*Primary Examiner*—Matthew O. Savage
*Attorney, Agent, or Firm*—Frishauf, Holtz, Goodman, Langer & Chick, P.C.

[57] ABSTRACT

A method and apparatus for reducing corrosion and lime deposits caused by water impurities on surfaces exposed to the water is disclosed herein. The apparatus and method employ a recirculation system for directing water through a magnetic treatment unit and a deflector system for flushing the surfaces subjected to corrosion and lime deposits. In the case of a water heater the deflector system includes a plurality of nozzles arranged to direct flows of magnetically treated water against a tank wall of the water heater, and a spiral loop with perforations facing a heating element or a cluster of heating elements of the water heater for directing flows of magnetically treated water against surfaces of the heating elements.

9 Claims, 7 Drawing Sheets

FOREIGN PATENT DOCUMENTS

| | | |
|---|---|---|
| 39 12 498 | 4/1990 | Germany . |
| 38 43 514 | 6/1990 | Germany . |
| 40 29 860 | 6/1991 | Germany . |
| 157813 | 8/1991 | Poland . |
| WO91/12209 | 8/1991 | WIPO . |
| WO9003948 | 12/1992 | WIPO . |

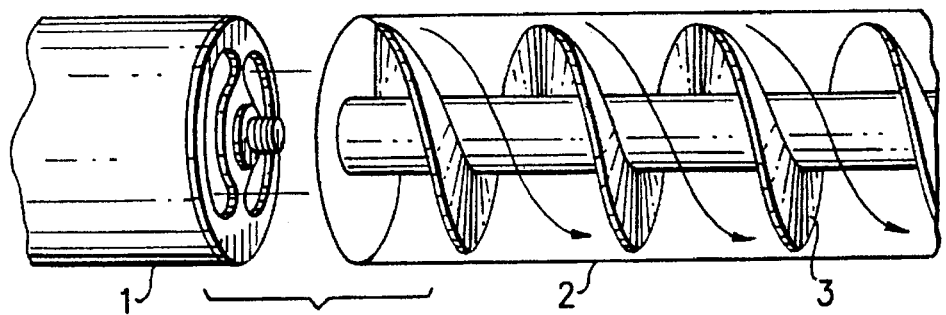
FIG. 1
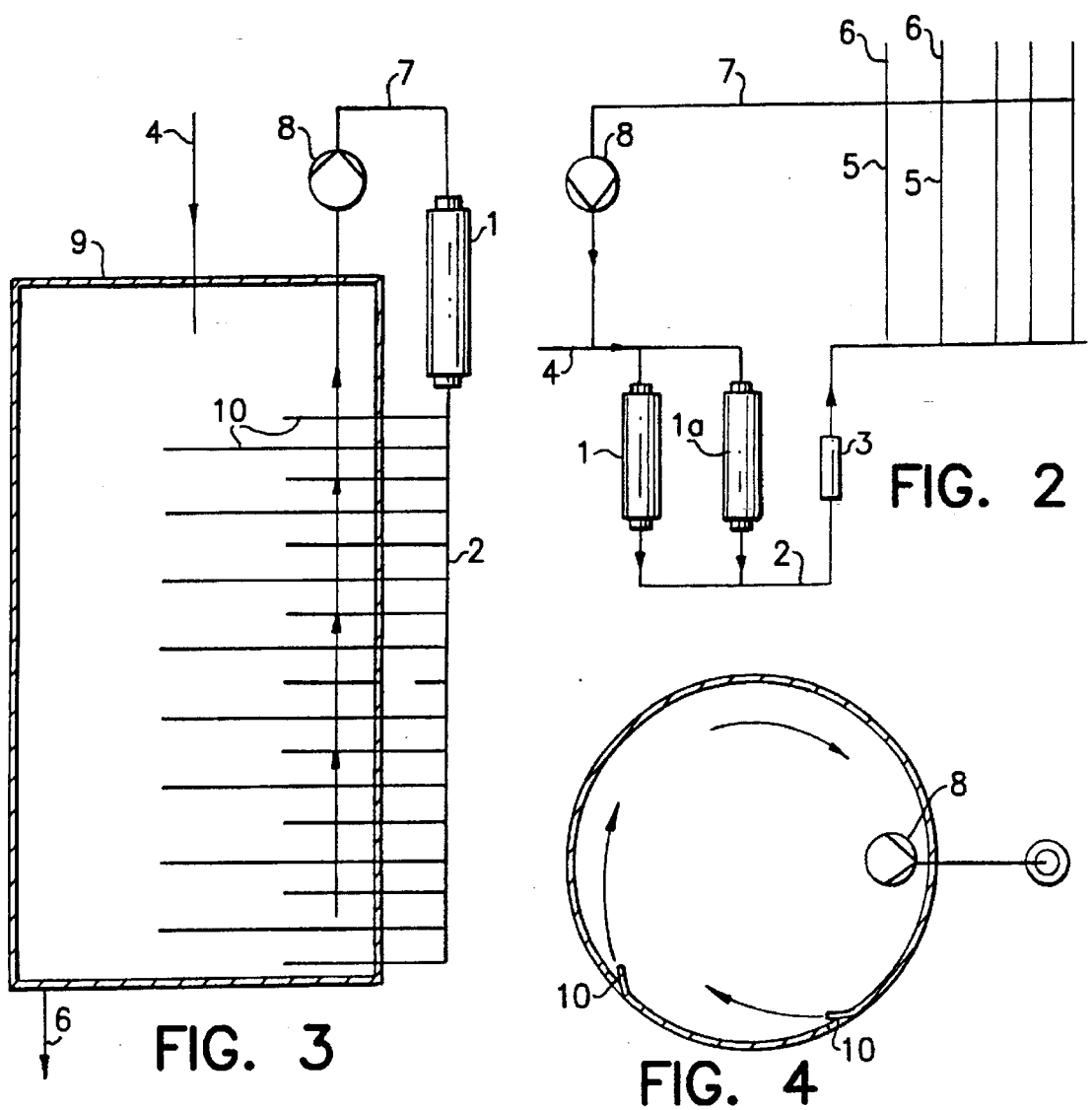
FIG. 2
FIG. 3
FIG. 4

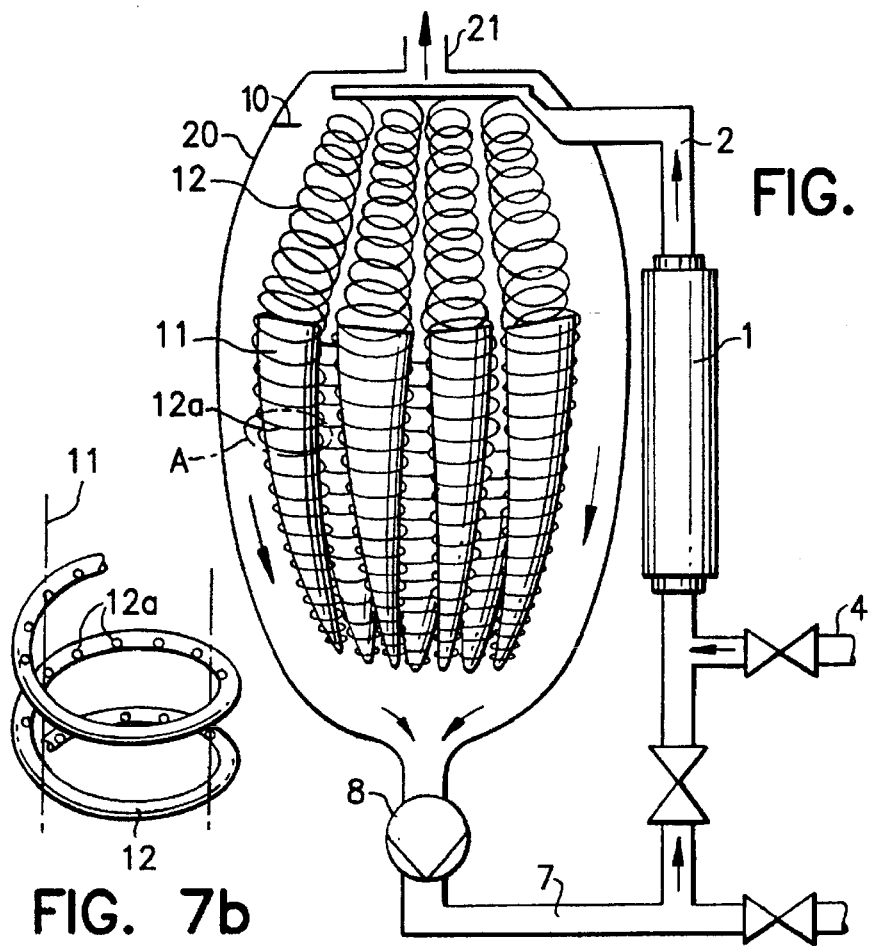
FIG. 7a
FIG. 7b
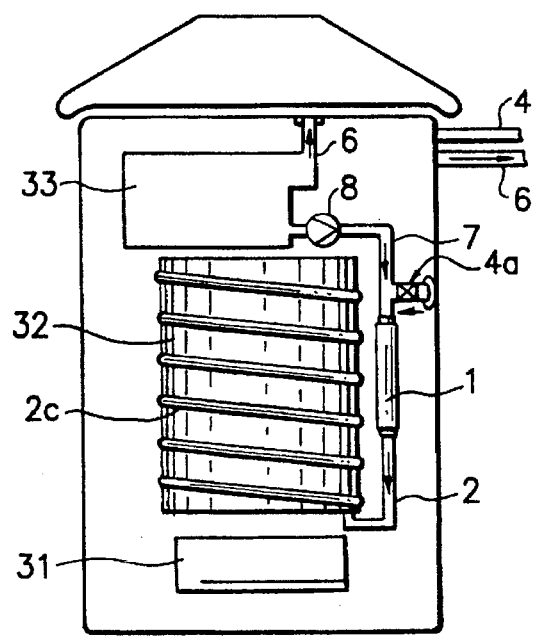
FIG. 9

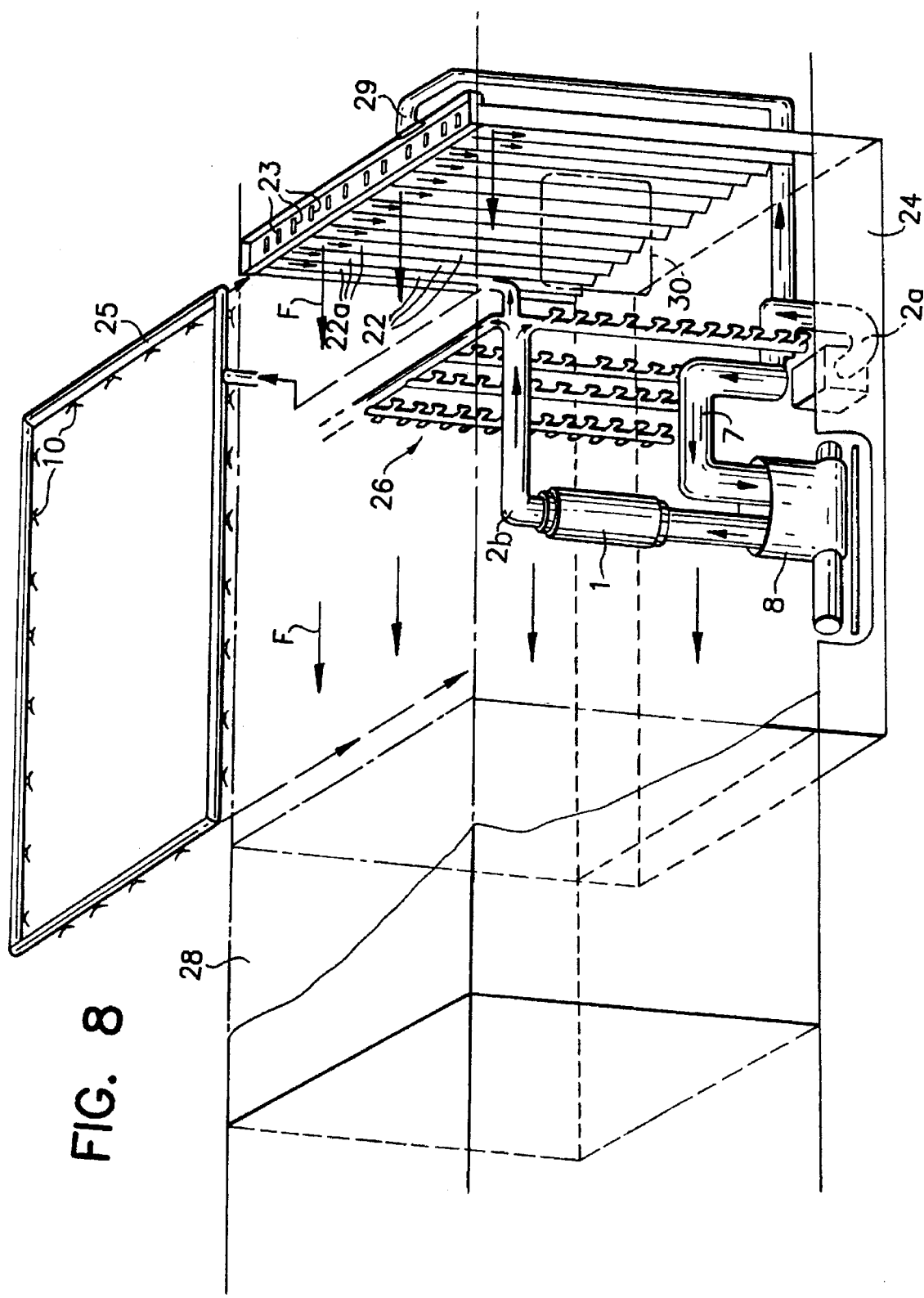

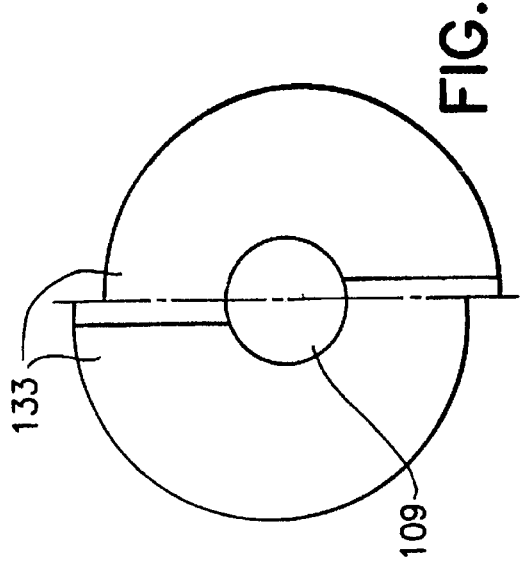
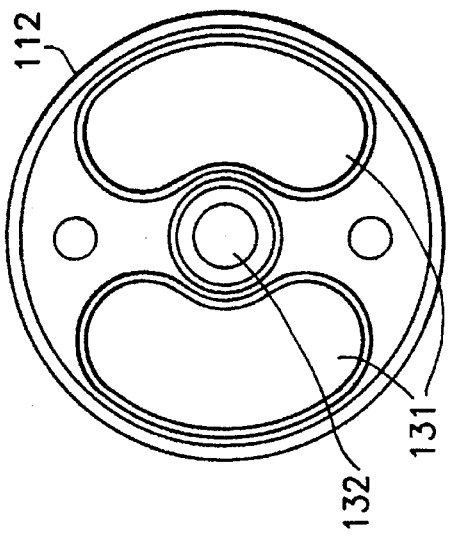
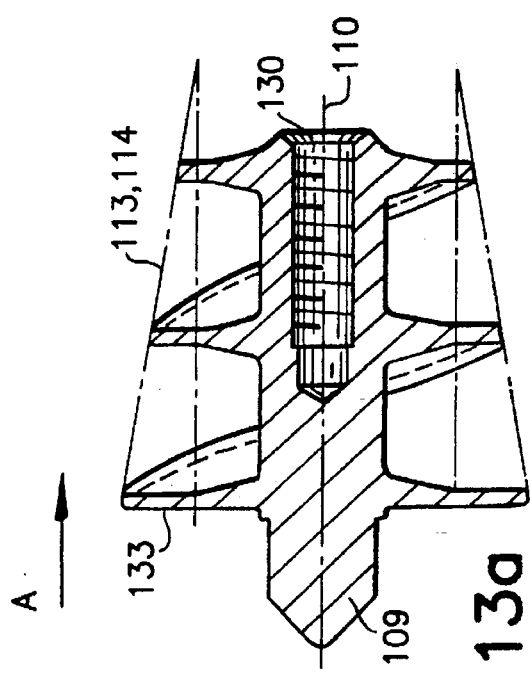
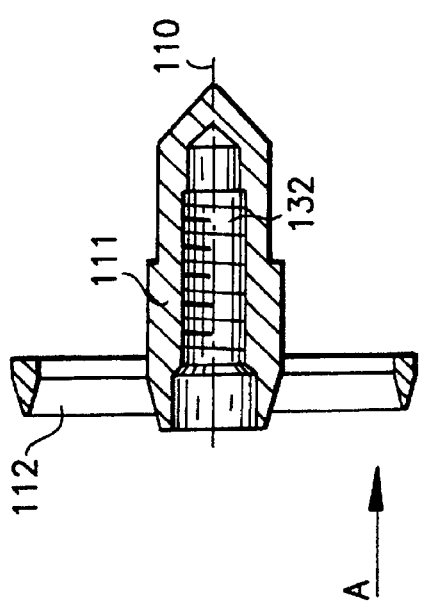

MAGNETIC WATER ACTIVATING PROCESS AND APPARATUS FOR REDUCING CORROSION AND LIME DEPOSITS FROM FLOWING WATER

FIELD OF THE INVENTION

The invention relates to a process and apparatus for reducing corrosion and lime deposits from salts in water solution by means of magnetic action exerted on water that is caused to flow past surfaces exposed to corrosion or encrustation.

BACKGROUND OF THE INVENTION

The action of magnetic fields on flowing water is already known to activate water so that it can prevent lime deposits on metal surfaces and even remove existing lime deposits therefrom. It is assumed that this effect is due to the fact that magnetic action exerted on flowing water produces a small number of "activated" centers which act as crystal seeds on which lime is separated, mainly in a finely granular form, and then remains dispersed. The effectiveness of the activated centers remains preserved over a certain period, 48 hours at the longest. It appears that protection of metal surfaces against corrosion is maintained by the "activated" water forming a thin protective film of lime, while the formation of limestone is prevented or existing encrustations removed. This physical treatment of the water is performed without chemical additives, but requires a careful mutual adaptation of the quantity of water flowing through and the number, arrangement and strength of the magnetic fields acting thereon. The process and an apparatus suitable for its performance are disclosed, for example, in German Utility Model 89 13 274. In such a device water flowing spirally in a tube is subjected to magnetic fields. It should be noted that a magnetic fluid treatment device such as disclosed in the above-mentioned German Utility Model is also similar to the one disclosed in FIG. 4 of U.S. Pat. No. 4,512,289 (Collins). Also, a magnetic water treatment device is commercially available and is manufactured under the trade name "Permasolvent" sold by the firm Perma-Trade GmbH.

A suitable device for providing a magnetic action on a fluid is shown in FIGS. 10–14b. The permanent-magnetic liquid-treatment device, illustrated in FIG. 10 in a longitudinal cross-section, serves the treatment of water and is equipped with a para-magnetic tubular housing 101 which is flowed through from left to right by the liquid to be treated. At both ends 105 and 106 of the housing, which is illustrated in FIG. 11 again in a longitudinal cross-sectional view without inserts, connecting pieces 107, 108, of which one is illustrated in FIG. 12a in a longitudinal cross-section, are bolted by an external thread 128 to an internal thread 129 of the housing 101 and tightly joined by washers 126 which are seated in annular grooves 127 on the inside wall 116 of the housing 101. In the housing 101 is placed, coaxially to its longitudinal axis 110 and at a distance from its inside wall 116, a plastic internal pipe 102, which ducts the water to be treated through the housing and the two ends of which 117, 118 are connected in a leakproof manner to the connecting pieces 107, 108 by way of sealing rings 125 which are seated in annular grooves 124 of the connecting pieces, and the aforementioned internal tube ends are seated on a shoulder 123 of a respective connecting piece and are axially clamped to the housing 101 when the connecting pieces 107, 108 are bolted together.

The through-flow cross-section of the connecting pieces 107, 108 expands in the direction of the housing ends 105, 106. These conical expansions 113, 114, which are shown in FIGS. 12a and 12b, are at the inner ends, i.e. in the area of the annular groove 123 of the connecting pieces, matched to the throughflow cross-section of the internal pipe 102, i.e. they merge directly into the latter cross-section whilst the outer ends of these conical expansions merge into cylindrically formed threaded pieces 119, 120, by means of which not illustrated portions of a pipeline, into which the device is built, are bolted.

The internal pipe 102 has a smooth wall on its inside, i.e. it is not provided with chicanes, and is centrically to the centre axis 110 pulled through by an iron spindle 115 which intrudes into the connecting pieces 107, 108. The upstream end of this spindle, the diameter of which is small by comparison with the diameter of the internal pipe 102 so as not to excessively constrict the throughflow cross-section of the internal pipe, is seated in a bore 30 of the screwshaped conveying device 109 which is designed as a double-path screw, as can be seen in FIGS. 13a and 13b, and seated in the conical expansion 113 of the connecting piece 107, so that the diameter of the screw paths is matched to this conical expansion, as is shown in the drawing.

The other end of the spindle 115, i.e. the downstream end within the connecting piece 108, is seated in a plateshaped centring device 111, 112 which is illustrated in FIGS. 14a and 14b, i.e. in a bore 132 of the hub 111 of this centring device which is surrounded by a centring disc 112 which is seated on the conical expansion 114, as is shown in FIG. 10, and which is provided with two large water throughflow openings 131 as is shown in FIG. 14b, located on both sides of the hub 11.

In the annular space, which is located between the internal pipe 102 and the tubular housing 101 and sealed in a leakproof manner at the end by the aforementioned seals 125 and 126 and the inner ends 121, 122 of the connecting pieces 107, 108, are arranged in series in the direction of the longitudinal axis 110 of the housing annular magnets 103 and spacers 104, and the annular magnets 103 are axially magnetized and placed in respective pairs in antipole fashion, as is indicated in the drawing by pole markings. Two successive pairs of annular magnets are then separated from each other by a spacer ring 104 which is an iron pole-shoe. These annular magnets and spacer rings are seated on the internal pipe and generate magnetic fields which are oriented predominantly at right angles to the spiralshaped flow of water which passes through the internal pipe 102. The spiralling water flow is caused by the double-path screw of the device 109 in the upstream connecting pieces of the device, and water flowing in the direction of the internal pipe 102 is accelerated due to its conical narrowing 113, so that the device is suitable for the treatment of both relatively small and relatively large volumes of water. It has been found that the desired water treatment results are already achieved with volumes of water of approximately 0.5 l/min, and equally so for larger throughflow volumes of up to 60 l/min and above. These treatment results relate to scale precipitation as well as formation of a protective layer in the internal pipe and removal of old incrustations in the attached pipe system as well as a reduction of pipe corrosion and consequently a saving in washing materials as well as favorable biological effects.

The double-path screw is an essential feature of the inventive device, as it directs, with only low loss of pressure, inflowing water essentially independently of the throughflow volumes at virtually the same angle through the internal pipe around the spindle 115, so that the total length of the spirally ducted waterflow is a multiple of the length of the internal pipe. This achieves over a relatively short path or length of the internal pipe, in an experimental model 184 mm, a great number of intersecting points between the waterflow and the magnetic fields, some of which move semi-circularly from one iron pole-shoe 104 to the other, and others are ducted directly to the spindle 115. The degree of efficiency in the treatment of water of this device is respectively high. The aforementioned experimental model of the inventive treatment device has a total length of 300 mm and an outside diameter of 54 mm, an internal pipe inside diameter of 19 mm, an outside throughflow diameter of the connecting pieces of 133, 5 mm which is reduced by the conical narrowings on the internal pipe diameter. This device is equipped with 14 powerful annular magnets according to the arrangement illustrated in FIG. 1 and with 8 spacer rings which concentrate the magnetic fields of the annular magnets arranged after the first and last spacer ring onto the centre of the iron pole-shoes. In this case, 8 magnetic fields are ducted by the ferrous spindle onto the spindle, and additional magnetic fields move semicircularly from one spacer ring in the form of an iron pole-shoe to the other.

In practice it has been found that although this prior art process is basically usable, it often fails to produce the required results to an adequate extent—i.e., more particularly it often only inadequately prevents or removes lime deposits. The invention is intended to obviate this disadvantage. It is based on the discovery that to achieve success the water, after being adequately activated by the magnetic treatment, must achieve participation in sufficiently intensive contact with the surfaces to be protected against, or freed from, lime deposits.

SUMMARY OF THE INVENTION

It is an object of the process and apparatus of this invention to enhance the effectiveness of the magnetically treated water for the required purpose by the feature that after emerging from the magnetic treatment device, the water flushes the surfaces to be treated with as high a flow speed as possible and as directly as possible. It is desirable for the largest possible proportion of the water volume to come into contact with the surface to be treated. If "activated" water is stationary for a time, for example, in pipes or tanks, thereby at least partially losing its effectiveness within a relatively short time, according to the invention the required effect is ensured by the feature that at least some of the stationary water is drawn off by a circulating pump for recycling in an ancillary circuit to the magnetic treatment device and again passed therethrough, so that the water reacquires its previous effectiveness.

To achieve as high a flow speed as possible and intensive flushing of the surfaces to be treated by such processes and apparatus at low cost and with low pressure losses, it has been found convenient to lead the stream of water in a spiral path opposite the surfaces of a tube, which are to be treated, and in larger tanks to direct component flows of recycled and magnetically treated water through nozzles directed towards wall surfaces and/or surfaces of heating elements to be treated.

The processes according to the invention are effective fort both cold and hot water and also, for example, in airconditioning plants and cooling towers and in steam generators or continuous flow heaters, the precondition in each case being merely that liquid, magnetically treated water flows over the surfaces of metal, ceramic material or plastics which are to be kept free from lime deposits or corrosion.

For removing lime deposits from a heater immersed in a tank or-boiler it is effective to use a spiral tube closed at its end and having holes directed inwardly towards a cluster of heating elements. It may be useful to suspend a receptacle in the tank below the heating elements for collecting encrustations that are loosened by the magnetically treated water.

BRIEF DESCRIPTION OF THE DRAWINGS

The invention will be further explained by the following embodiments diagrammatically illustrated in the drawings, wherein;

FIG. 1 shows an arrangement according to the invention in a water pipe,

FIG. 2 shows an arrangement according to the invention in a domestic water distribution system, Pig. 3 is a longitudinal section through a cold water tank having an apparatus according to the invention, FIG. 4 is a cross-section through the tank shown in FIG. 3, FIG. 7 shows a steam generator having deflecting devices according to the invention, FIG. 8 shows an air scrubber (cooling tower wet chamber) having deflecting devices according to the invention, and FIG. 9 shows a continuous flow gas heater having devices according to the invention.

FIG. 13a shows a longitudinal cross-sectional view of the screwshaped conveying means of the device;

FIG. 13b shows a front view of the device of FIG. 13a in the direction of arrow A;

FIG. 14a shows a longitudinal cross-sectional view of the centring device for the spindle of the device; and FIG. 14b shows a front view of the centring device of FIG. 14a in the direction of arrow A.

In the drawings like members or members of like effect have like reference numerals.

DESCRIPTION OF THE INVENTION

Figure 5:
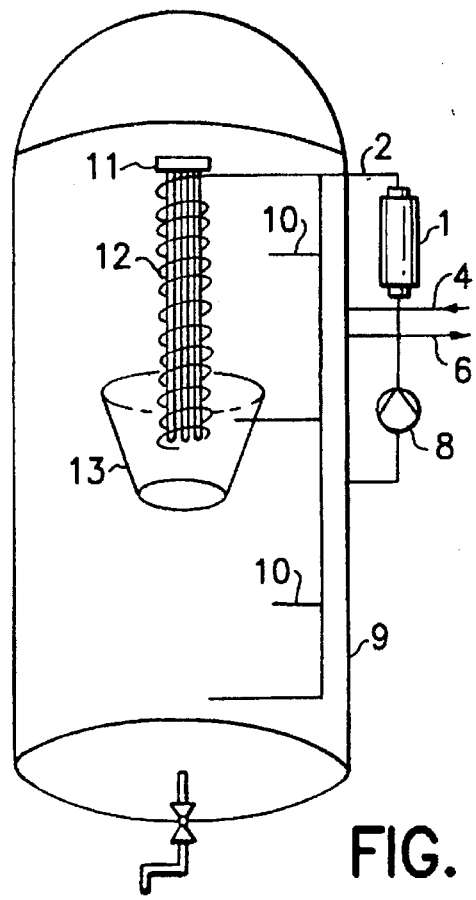
FIG. 5 shows a hot water boiler having deflecting devices according to the invention.

FIG. 1 illustrates diagrammatically the use of the invention in a system of pipes for cold or hot water. The water is first treated in a magnetic treatment device 1 constructed, for example, in the manner described in German Utility Model 89 13 274. For clarity the treatment device 1 is shown separately from a water pipe 2 which is connected sealingtight to the treatment device in the usual manner, for example, by a screwed muff. Disposed in the water pipe 2 is a deflecting device 3 according to the invention in the form of a preferably double spiral of sheet material whose external diameter is somewhat smaller than the internal diameter of the water pipe and which is also otherwise so dimensioned that as low a pressure loss as possible takes place in the water in the pipe. The spiral confers a radial component on the flow of water in the pipe 2; by centrifugal effect the water is brought more intensively to the inside wall of the pipe and comes into contact therewith over a longer distance than in the case of a merely axial flow. As a result the effectiveness of the magnetically treated water to prevent lime deposits is enhanced. When the pipe is made of metal, however, a desirable thin protective anti-corrosion layer is formed on the inside wall of the water pipe 2. The desired spiral flow is maintained by the water even after leaving the approximately 20 cm long spiral deflecting element 3, so that the desired effect also takes place in the adjoining pipe portion. In accordance with the requirements, after a certain pipe length of approximately 20 m a further deflecting element 3 according to the invention is incorporated in the pipe, to further enhance the effectiveness of the magnetically treated water.

FIG. 2 shows diagrammatically an arrangement according to the invention in a domestic water distributing pipe system. Water entering through a supply pipe 4 first passes through a magnetic treatment device 1, passes through a water pipe 2, in which possibly a deflecting element 3 according to the invention is incorporated, and is then distributed to pipes 5 extending to the tapping places 6. Each of the pipes can have a considerable length, for example, in a multi-storey residential building, and as a rule water is not continuously taken from the pipes. However, if water remains stationary in the pipes for a prolonged period or flows at only a low speed, lime deposits may form on the inside walls of the pipes, since the effectiveness of the magnetically treated water is not enough to prevent this. This effectiveness is enhanced according to the invention by the feature that a branch pipe 7 branches off from the water tapping pipes 5 adjacent the tapping places 6. The branch pipe 7 in the form of a collective main leads water to the inlet of a circulating pump 8, which delivers the water back to the magnetic treatment device 1. In this way a continuous flow of magnetically treated water is maintained throughout the pipe system and prevents the formation of lime deposits. In case a substantially larger quantity of water is temporarily tapped off than in the normal case, a second magnetic treatment device 1a is automatically connectable in parallel by means not shown.

FIG. 3 is a longitudinal section through a cold or hot water tank having an apparatus according to the invention. A tank 9 has a supply 4 and a removal pipe 6. Lime deposits are prevented in the tank by an ancillary circuit comprising a magnetic treatment device 1 from which magnetically treated water is passed through the pipe 2 to nozzles 10 which are distributed parallel with one another at a vertical and horizontal distance from one another over the height and circumference of the tank and which each conduct the magnetically treated water in a component flow against the tank wall, so that a circular flow is formed in the tank, as shown diagrammatically in FIG. 4. A circulating pump 8 draws water from the tank through an ancillary pipe 7, to supply the water continuously to the magnetic treatment device 1.

FIG. 5 shows diagrammatically a hot water boiler having a supply pipe 4 and a discharge pipe 6 and also a cluster of heating elements 11 (shown diagrammatically) whose electric connections are not shown. As in the case of the cold water tank (FIG. 3), a circulating pump 8 produces an ancillary circuit of recycled magnetically treated water in which the water drawn by the circulating pump passes through the magnetic treatment device 1 and the pipe 2 to deflecting elements 10 and 12, the deflecting elements 10 being, as in the case of the cold water tank (FIG. 3), sets of parallel nozzles which discharge in parallel and at a distance from one another on the inside wall of the boiler, where they produce a circular flow (FIG. 4). A tube spiral 12 is also provided which serves as a deflecting element for the water flow and encloses the cluster of heating elements 11. The tube spiral is closed at its end, but is formed with openings 12a distributed over its length from which magnetically treated water flows in the direction of the heating elements 11, to keep the elements free from lime deposits. Since lime deposits mainly form at the heating elements 11 but are loosened by the magnetically treated water, an intercepting open tank 13 is provided below the cluster of heating elements 11 to intercept the loosened lime deposits. It can be cleaned and removed, for example, from a normally closed lateral access hole (not shown).

Figure 6:
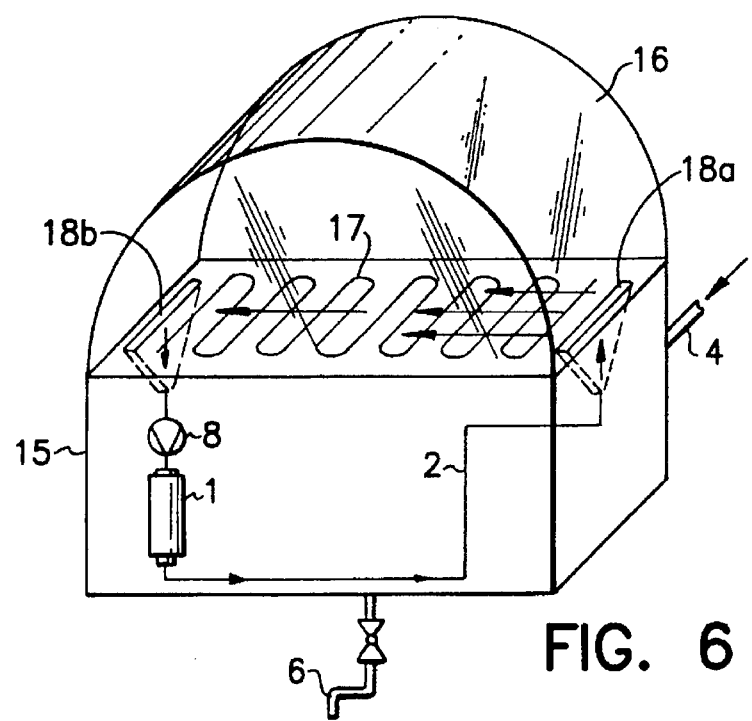
FIG. 6 shows a small hot water boiler having deflecting devices according to the invention.
Figure 10:
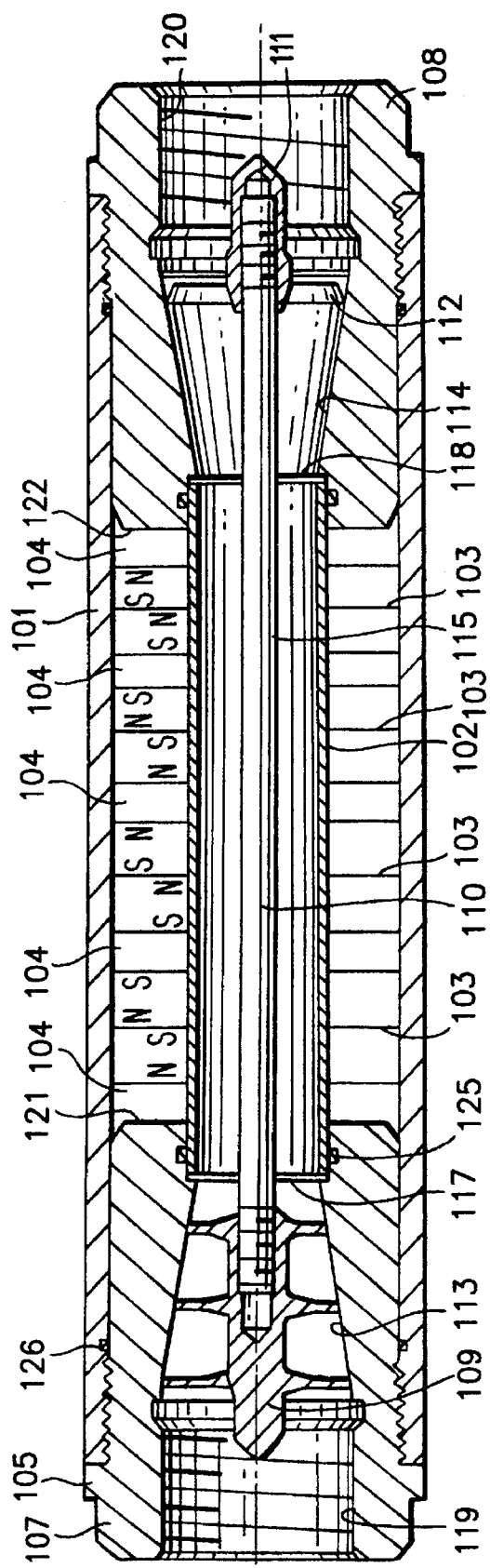
FIG. 10 shows a longitudinal cross-sectional view of the liquid-treatment device according to the invention.
Figure 11:
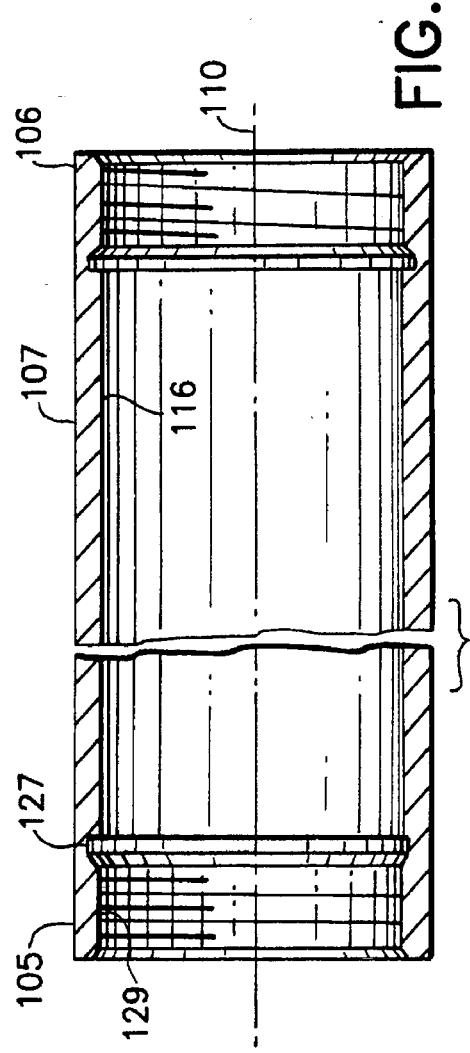
FIG. 11 shows a longitudinal cross-sectional view of the tubularly shaped housing of FIG. 10.
Figure 12B:
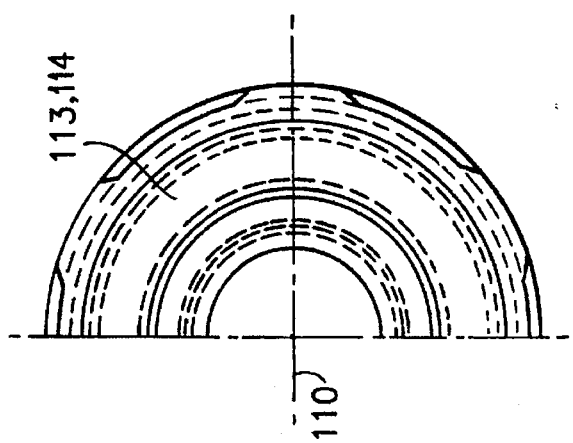
FIG. 12b shows a front view of the connecting piece of FIG. 12a in the direction of arrow A.
Figure 12A:
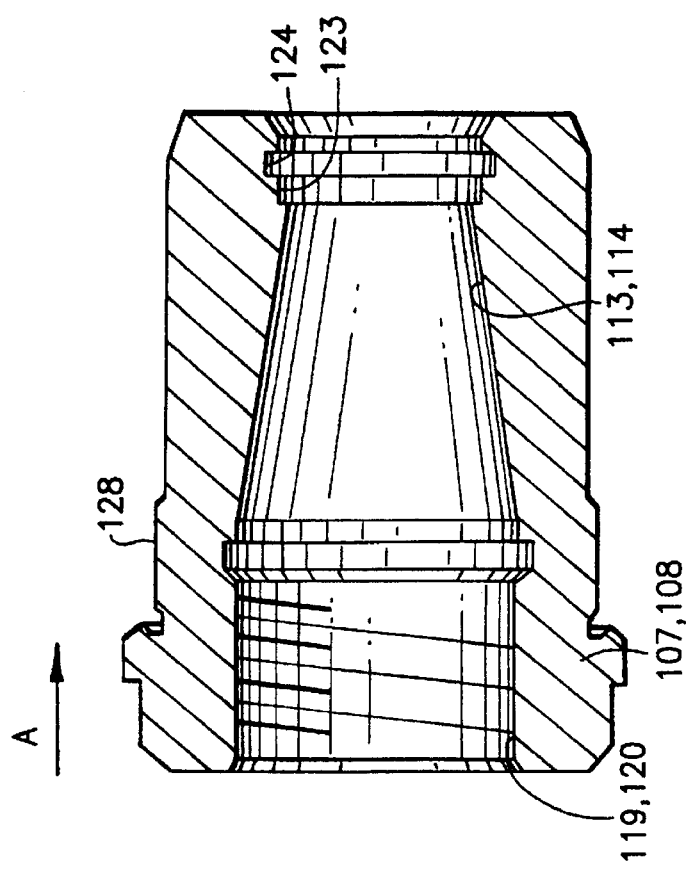
FIG. 12a shows a longitudinal cross-sectional side view of one of the two connection pieces of the device.

FIG. 6 shows a small hot water boiler as used, for example, in kitchens. The apparatus has a water supply pipe 4 and a removal pipe 6, as well as a casing 15 and a glass hood 16. The glass hood 16 forms the actual hot water tank in which, adjacent its bottom, a heating coil 17 extends horizontally and has electric connections. These electric connections and the inner piping connections of the supply to, and discharge from, the hot water tank are not shown. Also accommodated in the casing 15 is a magnetic treatment device 1 connected through the pipe 2 to a slotted flushing nozzle 18a which acts as a deflecting element and from which magnetically treated water is passed in a horizontal-flow over the heating coil 17 to a suction slot 18b through which circulating pump 8 draws water to recycle it through the magnetic treatment device 1. In this way again the magnetically treated water is passed directly and in a continuous flow over the surfaces to be kept free from lime deposits.

FIG. 7a shows, highly simplified and to a reduced scale, an industrial steam generator comprising heating elements 11 which are contained in a casing 20 made up of two shells and whose electric connections are not shown. The heating elements are immersed in water contained in the lower part of the tank and evaporate the water. The steam is drawn off through a top pipe 21. Water is supplied to the steam generator via pipe 4, magnetic treatment device 1 and the connected pipe 2. The tube spirals 12 enclosing the heating elements 11 serve as deflecting elements 12 for water supplied by the pipe 4. Similarly to the case of the hot water boiler illustrated in FIG. 5, the tube spirals are closed at their unconnected ends and formed over their length with holes 12a (FIG. 7b) from which magnetically treated water emerges in the direction of the walls of the heating elements 11, to wash around the heating elements intensively and prevent lime deposits thereon. The nozzles 10 disposed in the upper portion of the steam generator are connected to the water supply pipe 2 by means not shown and serve the same purpose as the similarly designated nozzles in the hot water boiler illustrated in FIG. 5. They pass magnetically treated water directly to the inside wall of the tank. To maintain the circulation of the magnetically treated water, some water contained in the tank 20 is continuously drawn off by the circulating pump 8 and recycled by the pipe 7 to the magnetic treatment device 1, from which the water returns through pipe 2 to the steam generator and more particularly to the spiral tubes 12 and to nozzles 10.

FIG. 8 is a diagrammatic exploded view of an air scrubber such as is used as a cooling tower wet chamber. The air flows in the direction indicated by arrows F, through slots 22a between spaced-apart parallel flat lamellae 22, into a filter chamber 28. The air flow is moistened in known manner by water emerging from nozzles which are constructed on nozzle connections 26 disposed one beside the other opposite the lamellae and spray out water in the direction of the lamellae 22. The air is therefore moistened by the atomized water and in contact with the sprayed lamellae 22. However, according to the invention this sprayed water is previously passed through the magnetic treatment device 1 before the water passes through the pipe 2 to the nozzle connections 26 The sprayed water running down the lamellae is collected in filter chamber sump 24, then sucked in by circulating pump 8 through pipe 7 and plumped back through the magnetic treatment device 1.

For the more effective prevention of lime deposits on the lamellae and walls, according to the invention a flow of magnetically treated water which has come from the magnetic treatment device 1 is passed via pipe 2a and a manifold supply pipe 29 to the top end of the lamellae 22 disposed one beside the other and arrives at that place in a manifold cavity which is constructed at the upper ends of the lamellae and from which it re-emerges near each lamella through at least one flushing slot 23. The magnetically treated water then runs down the lamellae to the sump 24, moistening the lamellae and keeping them free from lime deposits.

Lastly, the magnetically treated water is also taken through nozzles to the walls of the filter chamber, to keep these walls also free from lime encrustations. The nozzles 10 are the outlet openings of a frame-shaped pipe 25 which extends with a substantially rectangular contour under the cover of the filter chamber 28 adjacent the side walls, the lamellae and the side of the filter chamber opposite the lamellae. To make the drawing clearer, in FIG. 8 the tube frame 25 is shown lifted upwards. The magnetically treated water is supplied through the connecting pipe 2 which is connected to the magnetic treatment device 1. As usual, the filter chamber is accessible through a large window 30 for cleaning and removal of lime sludge.

FIG. 9 shows a continuous flow gas heater in which the water supplied via supply pipe 4 and connecting pipe 4a first passes through a magnetic treatment device 1 and then a heating coil 2c enclosing a chimney 32 heated by a burner 31, before the water passes into an intermediate vessel 33 and from there to a removal pipe 6. According to the invention an ancillary circuit is provided which recycles water from the intermediate vessel 33 via circulating pump 8 and pipe 7 to the magnetic treatment device and from there through the heating coil 2c, but only while there is no removal of heating water 6, so that the heating flame is out. In this way lime separation in the heating coil and the pipes is even more effectively prevented.

As already mentioned, the invention can be used quite in general to prevent deposits of lime from water not only on metal, but also on ceramic or plastic surfaces.

I claim:

1. In a process for reducing corrosion and lime deposits caused by water impurities on surfaces adjacent thereto, wherein a magnetic action is exerted on flowing water to produce magnetically treated water, the improvement comprising:

directing a flow of the magnetically treated water to impinge upon surfaces exposed to deposition of lime from water solution, at a flow speed such that said magnetically treated water flushes said surfaces;

wherein the step of directing the flow of the magnetically treated water to impinge upon surfaces to flush said surfaces includes a recycling step comprising exerting a magnetic action on at least a portion of previously magnetically treated water to further magnetically treat the water, and directing said portion of previously magnetically treated water to impinge upon said surfaces to flush said surfaces;

wherein the step of directing at least a portion of the magnetically treated water to impinge upon said surfaces to flush said surfaces comprises increasing the flow speed of the magnetically treated water by means of a deflecting element which increases a prior flow speed to a higher flow speed and which forms a plurality of component flows in the magnetically treated water to impinge upon said surfaces;

wherein the component flows of the magnetically treated water are directed to impinge upon surfaces of a cluster of heating elements through openings in a tube spiral, said tube spiral being closed at an end portion thereof and said tube spiral enclosing said cluster of tubular heating elements therein.

2. The process according to claim 1, wherein the recycling step is continuously maintained to produce a constant flow of magnetically treated water.

3. The process according to claim 1, wherein the step of directing at least a portion of the magnetically treated water to impinge upon said surfaces to flush said surfaces comprises directing the magnetically treated water in a horizontal direction tangentially toward a tank wall and then along said tank wall, by means of at least one nozzle.

4. In an apparatus for reducing corrosion and lime deposits caused by water impurities on surfaces exposed thereto, wherein a magnetic treatment device exerts a magnetic action on water flowing spirally in a tube, the improvement comprising:

a deflecting device for guiding water emerging from an output of the magnetic treatment device to form at least one water component flow to impinge upon said surfaces exposed to water impurities, said deflecting device having a configuration and being mounted so as to direct each of the at least one component flow to impinge upon said surfaces and flow past said surfaces so as to flush said surfaces;

wherein:

the deflecting device comprises a tube spiral (12) in which said magnetically treated water is led to flow, said tube spiral being closed at an end portion thereof, said tube spiral enclosing a cluster of heating elements (11) and said tube spiral being formed with holes (12a) distributed over a length thereof, said holes (12a) being constructed and arranged such that said at least one component flow of the magnetically treated water is directed to impinge upon the enclosed cluster of heating elements (11); and wherein said apparatus further comprises a circulating pump (8) for continuously supplying a quantity of recycled water via a connection means from the tank to the magnetic treatment device (1).

5. An apparatus according to claim 4, for use in a water heating system having a plurality of clusters of heating elements (11) disposed in a cylindrical tank, further comprising a circulating pump (8) for continually supplying recycled water via a connection means from the cylindrical tank to the magnetic treatment device (1).

6. An apparatus according to claim 5, further comprising an intercepting tank (13) which is open at a top portion thereof for collecting lime deposits, said intercepting tank being disposed in a plane that is below the cluster of heating elements (11) enclosed by the tube spiral.

7. In an apparatus for reducing corrosion and lime deposits caused by water impurities on surfaces exposed thereto, wherein a magnetic treatment device exerts a magnetic action on water flowing spirally in a tube, the improvement comprising:

a deflecting device for guiding water emerging from an output of the magnetic treatment device to form at least one water component flow to impinge upon said surfaces exposed to water impurities, said deflecting device having a configuration and being mounted so as to direct each of the at least one component flow to impinge upon said surfaces and flow past said surfaces so as to flush said surfaces; and wherein the apparatus is for use in a water heating system having a cluster of heating elements (11) disposed in a tank; wherein the deflecting device comprises a tube spiral (12) in which said magnetically treated water is led to flow, said tube spiral being closed at an end portion thereof, said tube spiral enclosing said cluster of heating elements (11) and said tube spiral being formed with holes (12a) distributed over a length thereof, said holes (12a) being constructed and arranged such that said at least one component flow of the magnetically treated water is directed to impinge upon the enclosed cluster of heating elements (11); and said apparatus further comprising a circulating pump (8) for continuously supplying a quantity of recycled water via a connection means from the tank to the magnetic treatment device (1).

8. In an apparatus for reducing corrosion and lime deposits caused by water impurities on surfaces exposed thereto, wherein a magnetic treatment device exerts a magnetic action on water flowing spirally in a tube, the improvement comprising:

a deflecting device for guiding water emerging from an output of the magnetic treatment device to form at least one water component flow to impinge upon said surfaces exposed to water impurities, said deflecting device having a configuration and being mounted so as to direct each of the at least one component flow to impinge upon said surfaces and flow past said surfaces so as to flush said surfaces; and wherein the apparatus is for use in a water heating system having at least one cluster of heating elements (11) disposed in a cylindrical tank;

the deflecting device comprises a plurality of deflecting units, each deflecting unit including a first deflector comprising a nozzle (10) which directs a portion of the flow of magnetically treated water to impinge upon a cylindrical wall of the cylindrical tank in a substantially tangential direction, and a second deflector comprising a tube spiral (12) closed at an end portion thereof, each said tube spiral of each second deflector of each deflecting unit enclosing a respective one of said cluster of heating elements (11) therein, each said tube spiral being formed with holes (12a) distributed over a length thereof, said holes (12a) being constructed and arranged so that flows of magnetically treated water emerging therefrom are directed to impinge upon the respective enclosed one of the cluster heating elements (11); and said apparatus further comprising a circulating pump (8) for continually supplying recycled water via a connection means from the cylindrical tank to the magnetic treatment device (1).

9. An apparatus according to claim 8, further comprising an intercepting tank (13) which is open at a top portion thereof for collecting lime deposits, said intercepting tank being disposed in a plane that is below the cluster of heating elements (11) enclosed by each said tube spiral.

* * * * *